United States Patent
Mate et al.

(10) Patent No.: US 11,812,235 B2
(45) Date of Patent: Nov. 7, 2023

(54) DISTRIBUTED AUDIO CAPTURE AND MIXING CONTROLLING

(71) Applicant: Nokia Technologies Oy, Espoo (FI)

(72) Inventors: Sujeet Shyamsundar Mate, Tampere (FI); Arto Lehtiniemi, Lempaala (FI); Antti Eronen, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1067 days.

(21) Appl. No.: 16/308,707

(22) PCT Filed: Jun. 7, 2017

(86) PCT No.: PCT/FI2017/050419
§ 371 (c)(1),
(2) Date: Dec. 10, 2018

(87) PCT Pub. No.: WO2017/220854
PCT Pub. Date: Dec. 28, 2017

(65) Prior Publication Data
US 2019/0149919 A1      May 16, 2019

(30) Foreign Application Priority Data
Jun. 20, 2016   (GB) .................................... 1610733

(51) Int. Cl.
*H04R 3/00*      (2006.01)
*H04H 60/04*     (2008.01)
(Continued)

(52) U.S. Cl.
CPC ............ *H04R 3/005* (2013.01); *G06F 3/165* (2013.01); *G06F 3/167* (2013.01); *H04H 60/04* (2013.01);
(Continued)

(58) Field of Classification Search
CPC ................................. H04R 3/005; H04R 3/00
See application file for complete search history.

(56) References Cited

U.S. PATENT DOCUMENTS 5,373,857 A * 12/1994 Travers .................. G01C 17/30
                                                                   600/595
11,589,181 B1 * 2/2023 Schaefer ................. H04S 3/004
(Continued)

FOREIGN PATENT DOCUMENTS

CN        101414000 A       4/2009
CN        101770139 A       7/2010
(Continued)

*Primary Examiner* — Olisa Anwah
(74) *Attorney, Agent, or Firm* — Harrington & Smith

(57) ABSTRACT

An apparatus including a processor configured to determine a position for at least one sound source relative to a reference position, and a position for a sound source tracker relative to the reference position. The processor further configured to determine a direction associated with the sound source tracker, select the at least one sound source based on an analysis of the direction associated with the sound source tracker, the position for the at least one sound source and the position of the sound source tracker. The processor is further configured to receive at least one control interaction associated with the selected at least one sound source from at least one controller, process at least one audio signal associated with the selected sound source based on the control interaction and output the processed at least one audio signal to be rendered.

20 Claims, 8 Drawing Sheets

(51) Int. Cl.
*H04S 7/00* (2006.01)
*G06F 3/16* (2006.01)
*H04R 1/10* (2006.01)
*H04R 1/40* (2006.01)

(52) U.S. Cl.
CPC ........... *H04R 1/1041* (2013.01); *H04R 1/406* (2013.01); *H04S 7/303* (2013.01); *H04R 2201/401* (2013.01); *H04R 2430/01* (2013.01); *H04R 2430/20* (2013.01); *H04R 2430/23* (2013.01); *H04R 2499/11* (2013.01); *H04S 2400/01* (2013.01); *H04S 2400/11* (2013.01); *H04S 2400/15* (2013.01); *H04S 2420/07* (2013.01)

(56) References Cited

U.S. PATENT DOCUMENTS

| | | |
|---|---|---|
| 2006/0104454 A1 | 5/2006 | Guitarte Perez et al. ... 381/71.6 |
| 2009/0116652 A1 | 5/2009 | Kirkeby et al. .................. 381/1 |
| 2010/0166406 A1 | 7/2010 | Fan ................................ 396/105 |
| 2012/0020503 A1* | 1/2012 | Endo .................... H04R 25/407 381/312 |
| 2013/0156220 A1* | 6/2013 | Bar-Zeev ............ G10L 21/0208 381/92 |
| 2013/0293688 A1* | 11/2013 | Benson ................. G02B 27/017 348/53 |
| 2014/0172432 A1 | 6/2014 | Sendai .......................... 704/276 |
| 2017/0153866 A1* | 6/2017 | Grinberg .............. G02B 27/017 |

FOREIGN PATENT DOCUMENTS

| | | |
|---|---|---|
| CN | 103036691 A | 4/2013 |
| CN | 103869470 A | 6/2014 |
| CN | 104167213 A | 11/2014 |
| CN | 105355213 A | 2/2016 |
| EP | 0544279 A2 | 6/1993 |
| EP | 1667113 A2 | 6/2006 |
| EP | 2 824 663 A2 | 1/2015 |
| EP | 3032848 A1 | 6/2016 |
| WO | WO 2013/093565 A1 | 6/2013 |

\* cited by examiner

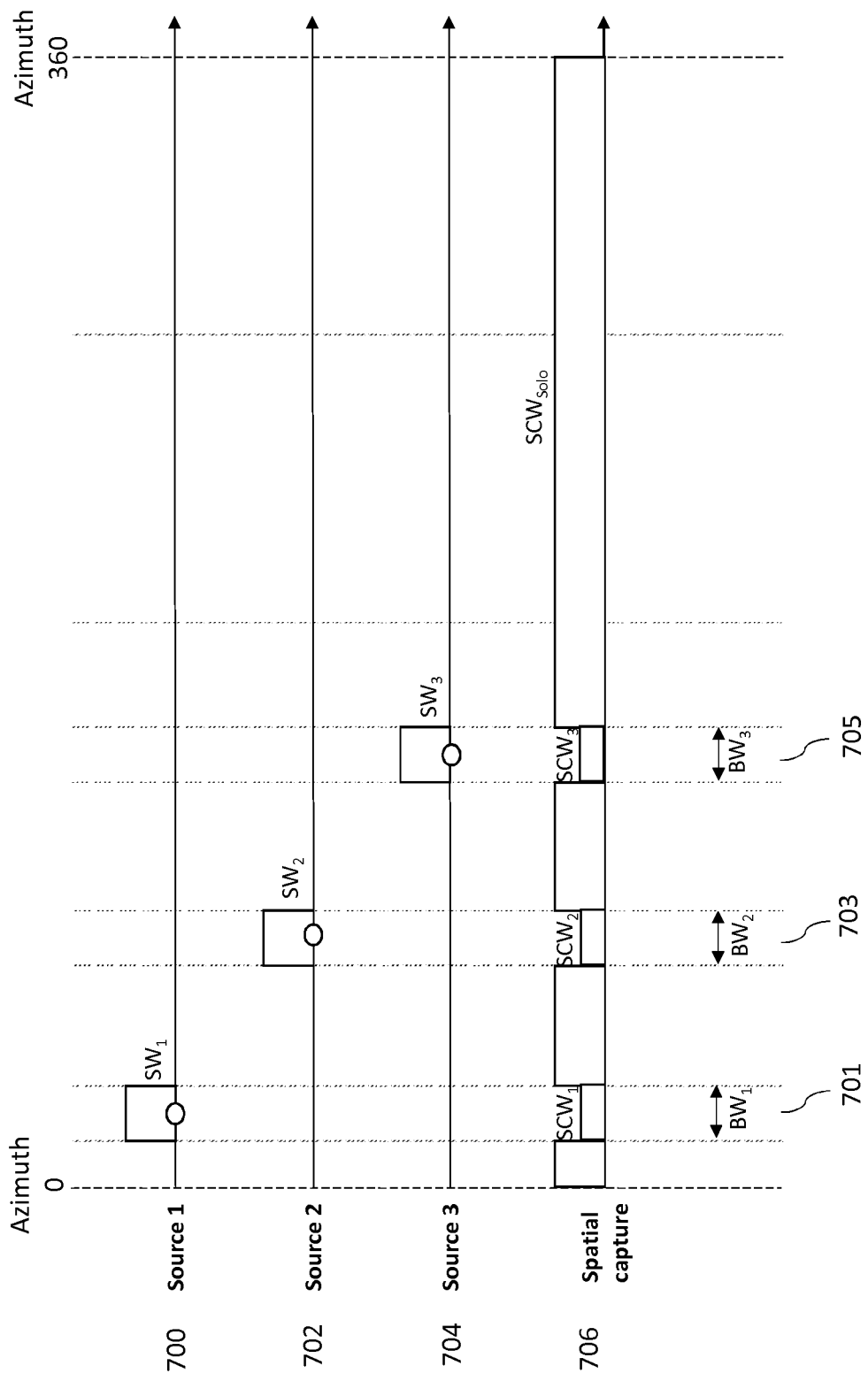

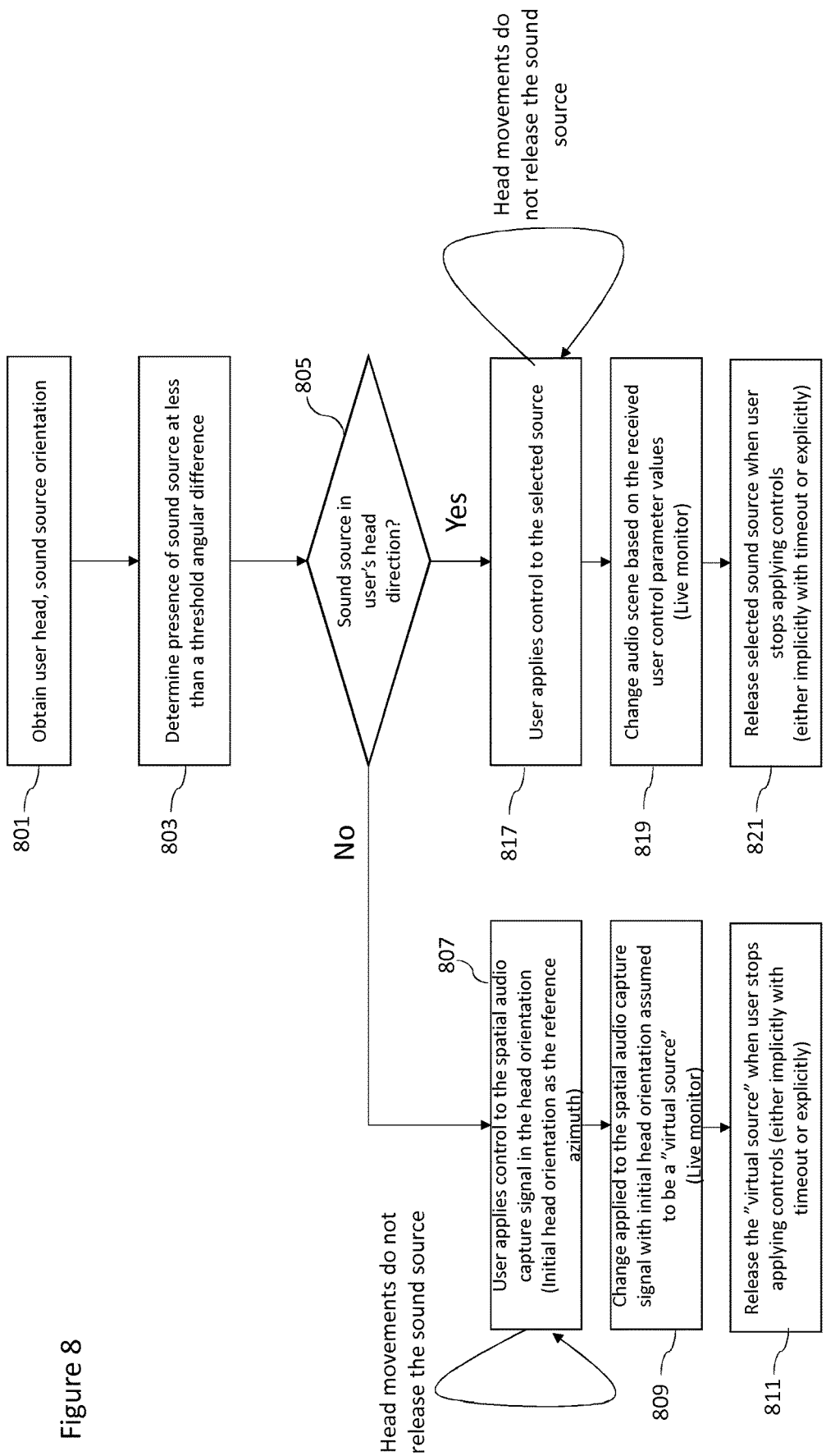

DISTRIBUTED AUDIO CAPTURE AND MIXING CONTROLLING

This patent application is a U.S. National Stage application of International Patent Application Number PCT/FI2017/050419 filed Jun. 7, 2017, which is hereby incorporated by reference in its entirety, and claims priority to GB 1610733.6 filed Jun. 20, 2016.

FIELD

The present application relates to apparatus and methods for distributed audio capture and mixing. The invention further relates to, but is not limited to, apparatus and methods for distributed audio capture and mixing for spatial processing of audio signals to enable spatial reproduction of audio signals.

BACKGROUND

The capture of audio signals from multiple sources and mixing of those audio signals when these sources are moving in the spatial field requires significant manual effort. For example the capture and mixing of an audio signal source such as a speaker or artist within an audio environment such as a theatre or lecture hall to be presented to a listener and produce an effective audio atmosphere requires significant investment in equipment and training.

A commonly implemented system would be for a professional producer to utilize a close or external microphone, for example a Lavalier microphone worn by the user or a microphone attached to a boom pole to capture audio signals close to the speaker or other sources external to a spatial audio signal. The producer could then manually mix this audio signal with a spatial (or environmental or audio field) audio signal such that the produced source appears to come from an intended direction. As would be expected manually positioning a sound source within the spatial audio field requires significant time and effort to do manually. Furthermore such professionally produced mixes are not particularly flexible and cannot easily be modified by the end user. For example to 'move' the close microphone audio signal within the environment requires further mixing adjustments in order that the close and audio field signals do not produce a perceived clash.

Furthermore the problem with such a setup is the ability to control the multiple microphones (which may also be dynamic) in an efficient and intuitive manner. The traditional method of using mixing hardware with large number of channels requires a large user interface and interaction method which is not agile enough to take into account many moving sources. The large user interfaces required are suitable only for static deployment and may inhibit comprehensive visibility of the event, if it is held in an ad hoc location.

Thus, there is a need to develop solutions in which the agility of the moving sources may be taken into account of.

SUMMARY

There is provided according to a first aspect an apparatus comprising a processor configured to: determine a position for at least one sound source relative to a reference position, and a position for a sound source tracker relative to the reference position; determine a direction associated with the sound source tracker; select the at least one sound source based on an analysis of the direction associated with the sound source tracker, the position for the at least one sound source and the position of the sound source tracker; receive at least one control interaction associated with the selected at least one sound source from at least one controller; process at least one audio signal associated with the selected sound source based on the control interaction; and output the processed at least one audio signal to be rendered.

The at least one sound source may comprise at least one of: an external microphone sound source; a close microphone sound source; and a spatial audio capture device microphone array sound source.

The sound source tracker may comprise at least one of: a digital compass configured to generate a direction; a gyroscope configured to generate a direction; a beacon positioning system configured to generate a direction; and a headset configured to generate a direction of the user of the controller.

The processor configured to select the at least one sound source based on an analysis of the direction associated with the sound source tracker, the position for the at least one sound source and the position of the sound source tracker may be configured to determine a direction of the at least one sound source relative to the sound source tracker.

The processor configured to determine a direction of the at least one sound source relative to the sound source tracker may be configured to offset the position of the at least one sound source based on the position of the at least one sound source tracker.

The reference position may be a position of an at least one spatial capture sound source.

The processor configured to select the at least one sound source based on an analysis of the direction associated with the sound source tracker, the position for the at least one sound source and the position of the sound source tracker may be configured to perform at least one of: select the at least one sound source when a difference between the direction of the at least one sound source relative to the sound source tracker and the direction associated with the sound source tracker is less than a threshold value; and select the at least one sound source when a difference between the direction of the at least one sound source relative to the sound source tracker and the direction associated with the sound source tracker is less than a threshold value for a selection time period.

The processor configured to determine a position for at least one sound source relative to a reference position may be further configured to: determine a position of at least one spatial capture sound source relative to the reference position; and determine a direction of the at least one spatial capture sound source relative to the sound source tracker.

The processor may be further configured to select the at least one spatial capture sound source based on the direction associated with the sound source tracker and the position of the at least one spatial capture sound source and the position of the sound source tracker, the processor may be configured to perform at least one of: select the at least one spatial capture sound source when a difference between the direction of the at least one sound source relative to the sound source tracker and the direction associated with the sound source tracker is greater than a threshold value; select the at least one spatial capture sound source when a difference between the direction of the at least one sound source relative to the sound source tracker and the direction associated with the sound source tracker is greater than a threshold value for a selection time period; select the at least one spatial capture sound source when a difference between the direction of the at least one spatial sound capture source relative to the sound source tracker and a direction associated with the sound source tracker is less than a threshold value for a selection time period; and select the at least one spatial capture sound source when a difference between the direction of the at least one spatial capture sound source relative to the sound source tracker and a direction associated with the sound source tracker is less than a threshold value for a selection time period.

The processor configured to receive at least one control interaction associated with the selected at least one sound source from at least one controller may be configured to: indicate to the at least one controller the selection of the at least one sound source such that the at least one controller is configured to generate at least one processing parameter value associated with the selected at least one sound source; receive the at least one processing parameter value from the at least one controller, and the processor configured to process at least one audio signal associated with the selected sound source based on the control interaction may be configured to process the at least one audio signal based on the at least one processing parameter value.

The processor may be configured to: determine at least one stored processing parameter value associated with the selected at least one sound source; indicate the at least one stored processing parameter value to the at least one controller, wherein the at least one controller is configured to display the at least one stored processing parameter value prior to the controller generating at least one processing parameter value associated with the selected at least one sound source.

The processor configured to process at least one audio signal associated with the selected sound source based on the control interaction may comprise at least one of: the processor being configured to filter/equalise the at least one audio signal; the processor being configured to delay the at least one audio signal; the processor being configured to apply a gain to the at least one audio signal; and the processor being configured to mix the at least one audio signal associated with the selected sound source to an audio signal associated with the at least one spatial capture device.

The processor may be configured to deselect the selected at least one sound source based on at least one of: the processor being configured to receive a deselection indicator from the at least one controller; the processor being configured to determine a time period since a received control interaction greater than an input deselection time period; the processor being configured to determine a change in the direction associated with the sound source tracker greater than a deselection direction range.

The sound source tracker may comprise a headband configured to generate the direction associated with the sound source tracker, the direction being associated with a viewing direction of the user.

The at least one controller may comprise a user input device configured to generate the at least one control interaction associated with the selected at least one sound source.

The sound source tracker may be integrated within a headband worn by the user, the headband furthermore integrating a pair of transducers, wherein the processor is configured to output the processed at least one audio signal to the pair of transducers to be rendered.

According to a second aspect there is provided a method for controlling a processing of at least one audio signal, the method comprising: determining a position for at least one sound source relative to a reference position, and a position for a sound source tracker relative to the reference position; determining a direction associated with the sound source tracker; selecting the at least one sound source based on an analysis of the direction associated with the sound source tracker, the position for the at least one sound source and the sound source tracker; receiving at least one control interaction associated with the selected at least one sound source from at least one controller; processing at least one audio signal associated with the selected sound source based on the control interaction; and outputting the processed at least one audio signal to be rendered.

Determining a direction associated with the sound source tracker may comprise one of: receiving a direction from a digital compass integrated within the sound source tracker; receiving a direction from a gyroscope integrated within the sound source tracker; and receiving a direction from a beacon positioning system integrated within the sound source tracker.

Selecting the at least one sound source based on an analysis of the direction associated with the sound source tracker may comprise determining a direction of the at least one sound source relative to the sound source tracker.

Determining a direction of the at least one sound source relative to the sound source tracker may comprise offsetting the position of the at least one sound source based on the position of the at least one sound source tracker.

The reference position may be a position of an at least one spatial capture sound source.

Selecting the at least one sound source based on an analysis of the direction associated with the sound source tracker may comprise at least one of: selecting the at least one sound source when a difference between the direction of the at least one sound source relative to the sound source tracker and the direction associated with the sound source tracker is less than a threshold value; and selecting the at least one sound source when a difference between the direction of the at least one sound source relative to the sound source tracker and the direction associated with the sound source tracker is less than a threshold value for a selection time period.

Determining a position for at least one sound source relative to a reference position, and a position for a sound source tracker relative to the reference position may further comprise: determining a position of at least one spatial capture sound source relative to the reference position; and determining a direction of the at least one spatial capture sound source relative to the sound source tracker.

The method may further comprise selecting the at least one spatial capture sound source based on the direction associated with the sound source tracker and the position of the at least one spatial capture sound source and the position of the sound source tracker, the selecting the at least one spatial sound source may comprise at least one of: selecting the at least one spatial capture sound source when a difference between the direction of the at least one sound source relative to the sound source tracker and the direction associated with the sound source tracker is greater than a threshold value; selecting the at least one spatial capture sound source when a difference between the direction of the at least one sound source relative to the sound source tracker and the direction associated with the sound source tracker is greater than a threshold value for a selection time period; selecting the at least one spatial capture sound source when a difference between the direction of the at least one spatial sound capture source relative to the sound source tracker and a direction associated with the sound source tracker is less than a threshold value for a selection time period; and selecting the at least one spatial capture sound source when a difference between the direction of the at least one spatial capture sound source relative to the sound source tracker and a direction associated with the sound source tracker is less than a threshold value for a selection time period.

Receiving at least one control interaction associated with the selected at least one sound source from at least one controller may comprise: indicating to the at least one controller the selection of the at least one sound source such that the at least one controller is configured to generate at least one processing parameter value associated with the selected at least one sound source; receiving the at least one processing parameter value from the at least one controller, and wherein processing at least one audio signal associated with the selected sound source based on the control interaction may comprise processing the at least one audio signal based on the at least one processing parameter value.

The method may further comprise: determining at least one stored processing parameter value associated with the selected at least one sound source; indicating the at least one stored processing parameter value to the at least one controller; and displaying using the at least one controller the at least one stored processing parameter value prior to the generating the at least one processing parameter value associated with the selected at least one sound source.

Processing at least one audio signal associated with the selected sound source based on the control interaction may comprise at least one of: filtering/equalising the at least one audio signal; delaying the at least one audio signal; applying a gain to the at least one audio signal; and mixing the at least one audio signal associated with the selected sound source to an audio signal associated with the at least one spatial capture device.

The method may further comprise deselecting the selected at least one sound source based on at least one of: receiving a deselection indicator from the at least one controller; determining a time period since a received control interaction greater than an input deselection time period; determining a change in the direction associated with the sound source tracker greater than a deselection direction range.

Determining a direction associated with the sound source tracker may comprise determining a viewing direction of the user.

According to a third aspect there is provided an apparatus for controlling a processing of at least one audio signal, the apparatus comprising: means for determining a position for at least one sound source relative to a reference position, and a position for a sound source tracker relative to the reference position; means for determining a direction associated with the sound source tracker; means for selecting the at least one sound source based on an analysis of the direction associated with the sound source tracker, the position for the at least one sound source and the position of the sound source tracker; means for receiving at least one control interaction associated with the selected at least one sound source from at least one controller; means for processing at least one audio signal associated with the selected sound source based on the control interaction; and means for outputting the processed at least one audio signal to be rendered.

The means for determining a direction associated with the sound source tracker may comprise one of: means for means for receiving a direction from a digital compass integrated within the sound source tracker; means for receiving a direction from a gyroscope integrated within the sound source tracker; and means for receiving a direction from a beacon positioning system integrated within the sound source tracker.

The means for selecting the at least one sound source based on an analysis of the direction associated with the sound source tracker may comprise means for determining a direction of the at least one sound source relative to the sound source tracker.

The means for determining a direction of the at least one sound source relative to the sound source tracker may comprise means for offsetting the position of the at least one sound source based on the position of the at least one sound source tracker.

The reference position may be a position of an at least one spatial capture sound source.

The means for selecting the at least one sound source based on an analysis of the direction associated with the sound source tracker may comprise at least one of: means for selecting the at least one sound source when a difference between the direction of the at least one sound source relative to the sound source tracker and the direction associated with the sound source tracker is less than a threshold value; and means for selecting the at least one sound source when a difference between the direction of the at least one sound source relative to the sound source tracker and the direction associated with the sound source tracker is less than a threshold value for a selection time period.

The means for determining a position for at least one sound source relative to a reference position, and a position for a sound source tracker relative to the reference position may further comprise: means for determining a position of at least one spatial capture sound source relative to the reference position; and means for determining a direction of the at least one spatial capture sound source relative to the sound source tracker.

The apparatus may further comprise means for selecting the at least one spatial capture sound source based on the direction associated with the sound source tracker and the position of the at least one spatial capture sound source and the position of the sound source tracker, the means for selecting the at least one spatial sound source may comprise at least one of: means for selecting the at least one spatial capture sound source when a difference between the direction of the at least one sound source relative to the sound source tracker and the direction associated with the sound source tracker is greater than a threshold value; means for selecting the at least one spatial capture sound source when a difference between the direction of the at least one sound source relative to the sound source tracker and the direction associated with the sound source tracker is greater than a threshold value for a selection time period; means for selecting the at least one spatial capture sound source when a difference between the direction of the at least one spatial sound capture source relative to the sound source tracker and a direction associated with the sound source tracker is less than a threshold value for a selection time period; and means for selecting the at least one spatial capture sound source when a difference between the direction of the at least one spatial capture sound source relative to the sound source tracker and a direction associated with the sound source tracker is less than a threshold value for a selection time period.

The means for receiving at least one control interaction associated with the selected at least one sound source from at least one controller may comprise: means for indicating to the at least one controller the selection of the at least one sound source such that the at least one controller is configured to generate at least one processing parameter value associated with the selected at least one sound source; means for receiving the at least one processing parameter value from the at least one controller, and wherein the means for processing at least one audio signal associated with the selected sound source based on the control interaction may comprise means for processing the at least one audio signal based on the at least one processing parameter value.

The apparatus may further comprise: means for determining at least one stored processing parameter value associated with the selected at least one sound source; means for indicating the at least one stored processing parameter value to the at least one controller; and means for displaying using the at least one controller the at least one stored processing parameter value prior to the generating the at least one processing parameter value associated with the selected at least one sound source.

The means for processing at least one audio signal associated with the selected sound source based on the control interaction may comprise at least one of: means for filtering/equalising the at least one audio signal; means for delaying the at least one audio signal; means for applying a gain to the at least one audio signal; and means for mixing the at least one audio signal associated with the selected sound source to an audio signal associated with the at least one spatial capture device.

The apparatus may further comprise means for deselecting the selected at least one sound source based on at least one of: means for receiving a deselection indicator from the at least one controller; means for determining a time period since a received control interaction greater than an input deselection time period; means for determining a change in the direction associated with the sound source tracker greater than a deselection direction range.

The means for determining a direction associated with the sound source tracker may comprise means for determining a viewing direction of the user.

According to a fourth aspect there is provided apparatus comprising a processor configured to: determine a position for at least one sound source relative to a reference position; identify the at least one sound source position with a sound source tracker; select the at least one sound source based on a pre-determined gesture of the sound source tracker; receive at least one control interaction associated with the selected at least one sound source from at least one controller; modify at least one audio signal of the selected sound source based on the at least one control interaction with the controller; and output the modified at least one audio signal for rendering.

According to a fifth aspect there is provided a method comprising: determining a position for at least one sound source relative to a reference position; identifying the at least one sound source position with a sound source tracker; selecting the at least one sound source based on a pre-determined gesture of the sound source tracker; receiving at least one control interaction associated with the selected at least one sound source from at least one controller; modifying at least one audio signal of the selected sound source based on the at least one control interaction with the controller; and outputting the modified at least one audio signal for rendering.

According to a sixth aspect there is provided an apparatus comprising: means for determining a position for at least one sound source relative to a reference position; means for identifying the at least one sound source position with a sound source tracker; means for selecting the at least one sound source based on a pre-determined gesture of the sound source tracker; means for receiving at least one control interaction associated with the selected at least one sound source from at least one controller; means for modifying at least one audio signal of the selected sound source based on the at least one control interaction with the controller; and means for outputting the modified at least one audio signal for rendering.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 7 shows an example mixing operation according to some embodiments;

FIG. 8 shows a flow diagram of the operation of the example audio mixer according to some embodiments.

EMBODIMENTS OF THE APPLICATION

Figure 1:
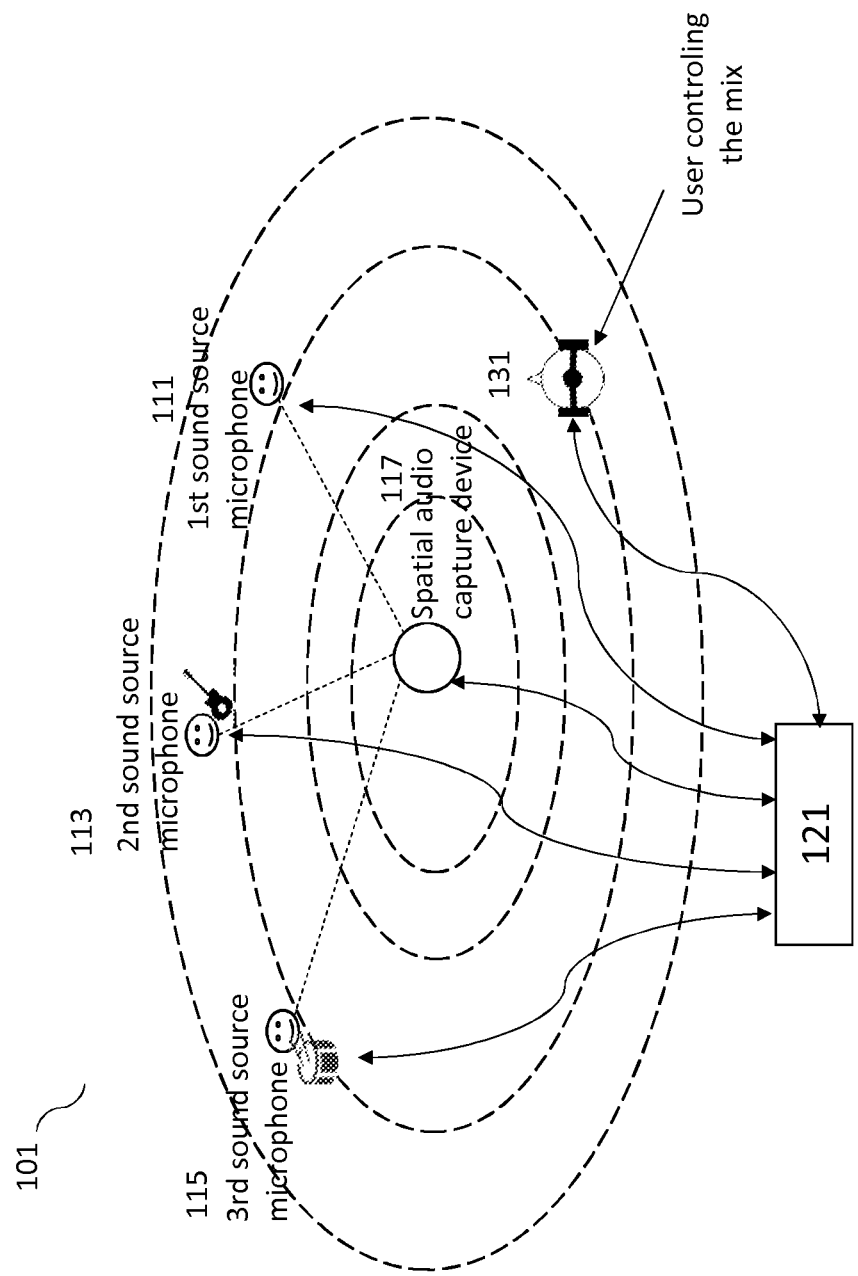
FIG. 1 shows schematically a distributed audio capture and mixing system suitable for implementing spatial audio mixing according to some embodiments.

The following describes in further detail suitable apparatus and possible mechanisms for the provision of effective mixing of audio signals from multiple sources. In the following examples, audio signals and audio capture signals are described. However it would be appreciated that in some embodiments the apparatus may be part of any suitable electronic device or apparatus configured to capture an audio signal or receive the audio signals and other information signals.

As described previously a conventional approach to the capturing and mixing of audio sources with respect to an audio background or environment audio field signal would be for a professional producer to utilize external and background microphones. The external microphone (or close microphone or Lavalier microphone worn by the user or a microphone attached to a boom pole) captures audio signals close to the audio or sound source. The background microphone captures an environmental or spatial audio signal. These signals or audio tracks may then be manually mixed to produce an output audio signal such that the produced sound features the audio source coming from an intended (though not necessarily the original) direction.

As would be expected this requires significant time and effort and expertise to do correctly. Similarly as discussed above mixing hardware with a large number of channels requires large user interfaces which are typically not agile enough to take into account or control effectively many moving sources. Furthermore the large user interface space to display the large number of channels to be monitored is not suitable for portable or mobile implementations and only for static deployment. As such only a single user at a single position would be able to monitor and mix the audio sources.

The concept as discussed in detail hereafter may for example be embodied as a mixer (and associated mixer control and mixer interface) system. This mixer system may be part of a capture system configured to capture both external (speaker, instrument or other source) audio signals and a spatial (audio field) audio signal. The capture system may furthermore be configured to determine or classify a source and/or the space within which the source is located. This information may then be stored or passed to the mixer which having received the audio signals and suitable mixer inputs may use these inputs to generate a suitable mixing of the audio signal.

The embodiments described hereafter allow mixing of captured audio signals without the need for large user interfaces and/or VR headsets. These thus enable mixing to be controlled from any point in the audio scene. The system furthermore allows for an ad-hoc mixing position for the user performing the mix and enables a mixing of a large number of dynamic sound sources.

A suitable method and apparatus for an agile in-situ audio mixing of distributed audio capture system is described hereafter. The examples hereafter are described with respect to mixing of live content. However further examples may be employed which are suitable for mixing both live and recorded content (or only recorded content) where the recorded content is associated with an identifiable visual indicator for the operator of the mixer.

The method as described in further detail hereafter consists of using outputs from a head tracking or more generally another sound source selector mechanism in combination with outputs from a portable controller to modify mixing parameters associated with one or more tracked sound sources. The sound sources to be modified are selected by the user by 'looking at' the sound sources and subsequently modifying any associated mix parameters (e.g., gain, filter parameters). This technique of selecting and controlling can be described as "Look and Do". The sound source is selected if the user's head position is determined to be within a predefined threshold of the sound source's determined direction. The user performing the mix can be located away from the microphone array (which is typically the reference position for distributed audio capture systems) and select the external sound sources for modification, but can hear the audio mix as if they are located in the centre of the microphone array position.

In some embodiments, the sound source (with a close-up microphone) in the direction of the user's head position is then processed or modified in the mix based on the control input from the controller. For example the audio or sound source may be emphasized. If there is no audio source in the 'selected' direction, the audio mixer may modify an audio parameter in the mix for the microphone array audio capture in the 'selected' direction. For example the microphone array audio capture may be emphasized. The beam width for the selection (and the parameter modification such as the emphasis) may be predefined while emphasizing the audio signal from the close-up microphone sources or from the microphone array.

In another embodiment, if the external microphone positions are separated by a distance/angle less than a predefined threshold, the sound sources can be separated or combined based on the audio classification. For example, the sound sources can be classified into speech, vocal, musical instrument, etc. Subsequently the user performing the mix may select/unselect the required sound sources. For example in a chorus, multiple sound sources may be combined for joint control.

Although the capture, mixer and render systems in the following examples are shown as being separate, it is understood that they may be implemented with the same apparatus or may be distributed over a series of physically separate but communication capable apparatus.

Furthermore it is understood that at least some elements of the following apparatus may be implemented within a distributed computing system such as known as the 'cloud'.

With respect to FIG. 1 is shown a system 101 comprising capture, mixing, and rendering apparatus suitable for implementing spatial audio capture, mixing and rendering according to some embodiments.

In the following examples there is shown three external sound sources, however more than three or fewer than three sound sources may be captured and the following apparatus and methods applied. For example the system 101 comprises a first sound source microphone 111. The first sound source microphone 111 may be a Lavalier microphone or other example of a 'close' sound source capture apparatus. For example in some embodiments the first sound source microphone may be a boom microphone or similar neighbouring microphone capture system. The first sound source microphone 111 may in some embodiments be a microphone array. The first sound source microphone 111 as shown in FIG. 1 may be a microphone associated with a first audio source such as a vocalist.

The system 101 may also comprise a second sound source microphone 113. The second sound source microphone 113 may be a microphone or microphone array associated with a second audio source such as an instrument. For example as shown in FIG. 1 the second sound source microphone is an internal microphone system (pick-up microphone) in an electric guitar.

The system 101 may also comprise a third sound source microphone 115. The third sound source microphone 115 may be a microphone or microphone array associated with a third audio source. For example as shown in FIG. 1 the third sound source microphone is a microphone associated with a drum.

It is understood that the sound source microphones 111, 113, 115 may move dynamically with their associated sound source. Thus with respect to the example shown in FIG. 1 when the vocalist (the first sound source) moves the first sound source microphone 111 follows the vocalist, when the guitar moves the second sound source microphone 113 follows the guitar and when the drum moves the third sound source microphone 115 follows the drum.

The sound source microphones 111, 113, 115 may be configured to output their captured audio signals to a mix processor 121. For example a first sound source microphone 111 may comprise a transmitter unit (not shown), which wirelessly transmits the audio signal to a receiver unit (not shown) on the mixer 121.

The system 101 comprises a spatial audio capture (SPAC) device 117. The spatial audio capture device 117 is an example of an 'audio field' capture apparatus and may in some embodiments be a directional or omnidirectional microphone array configured to capture an audio signal associated with an ambient sound scene represented by the sound sources described herein and other ambient sound sources. The spatial audio capture device 117 may be configured to output the captured audio signals to the mix processor 121.

In some embodiments the spatial audio capture device 117 is implemented within a mobile device. The spatial audio capture device is thus configured to capture spatial audio, which, when rendered to a listener, enables the listener to experience the sound field as if they were present in the location of the spatial audio capture device.

The spatial audio capture device 117 furthermore may comprise a position determiner or tracker. The position tracker or determiner may be configured to generate a suitable output identifying the position of the sound source microphones 111, 113, 115 (and therefore their associated sound sources) relative to the spatial audio capture device 117 and output this information to the mix processor 121. In the following examples the spatial audio capture device is used as an example of a reference position, however any suitable object position may be used as the reference. The position determination/tracking may be achieved by any suitable means or method.

For example in some embodiments the positioning system may use satellite positioning signals (or other beacon signals) to estimate the positions of the sources and the spatial audio capture device (and in some embodiments the mixer). These estimated positions may be transmitted to a position determiner or position tracker configured to receive the positions and in some embodiments determine positions of the sources relative to the spatial capture devices (and/or mixer or mix controller).

The position determination may be performed by local radio-frequency signal estimation. Thus for example the sound source microphones may comprise position tags. The position tags may be configured to generate and transmit radio frequency signals which can be received be a suitable receiver which enables the receiver or position determiner determine information suitable for identifying the position or location of the sound source microphones relative to the receiver. The spatial audio capture device 117 thus may further comprise a position tag receiver configured to receive the radio frequency signals from the position tags associated with the sound sources. The spatial audio capture device 117 may further comprise a position determiner configured to determine an estimate of the position of the tag relative to the spatial audio capture device. As microphones worn by people/located on instruments can freely move in the acoustic space, the position determiner has to support continuous sensing of microphone position.

In some embodiments the receiver and/or position tracker or determiner may be separate from the spatial audio capture device 117. In such embodiments the spatial audio capture device itself comprises (or is associated with) a position tag generating a radio frequency signal which enables the receiver/position determiner to estimate the position of the spatial audio capture device relative to the position determiner. The position determiner may then determine the relative position(s) of the sound sources (or their associated position tags) and the spatial audio capture device (and its associated position tag).

In some embodiments the position tags and the position determiner are implemented using a High Accuracy Indoor Positioning (HAIP) system or another suitable indoor positioning technology. Thus the position tags are HAIP tags, and the position receiver/tracker is a HAIP locator configured to track the positions of the tags.

In some embodiments, in addition to radio frequency based position estimation, the position determiner/tracker may use video content analysis and/or sound source localization.

Thus in some embodiments the position or location of the spatial audio capture device determined. The location of the spatial audio capture device may be denoted (at time 0) as $$(x_S(0), y_S(0))$$

In some embodiments there may be implemented a calibration phase or operation (in other words defining a 0 time instance) where a first sound source (s1) microphone is positioned in front of the SPAC array at some distance within the range of a HAIP locator. This position of the first sound source microphone may be denoted as $$(x_{S1}(0), y_{S1}(0))$$

Furthermore in some embodiments this calibration phase can determine the 'front-direction' of the spatial audio capture device in the HAIP coordinate system. This can be performed by firstly defining the array front direction by the vector $$(x_{S1}(0) - x_S(0), y_{S1}(0) - y_S(0))$$

This vector may enable the position tracker to determine an azimuth angle $\alpha_{S1}$ and the distance $d_{S1}$ with respect to the array.

For example given a first sound source microphone position at time t $$(x_{S1}(t), y_{S1}(t))$$

The direction relative to the array is defined by the vector $$(x_{S1}(t) - x_S(0), y_{S1}(t) - y_S(0))$$

The azimuth $\alpha$ may then be determined as $$\alpha = a\tan 2(y_{S1}(t) - y_S(0), x_{S1}(t) - x_S(0)) - a\tan 2(y_{S1}(0) - y_S(0), x_{S1}(0) - x_S(0))$$

where a tan 2(y,x) is a "Four-Quadrant Inverse Tangent" which gives the angle between the positive x-axis and the point (x,y). Thus, the first term gives the angle between the positive x-axis (origin at $x_S(0)$ and $y_S(0)$) and the point $(x_{S1}(t), y_{S1}(t))$ and the second term is the angle between the x-axis and the initial position $(x_{S1}(0), y_{S1}(0))$. The azimuth angle may be obtained by subtracting the first angle from the second.

The distance d can be obtained as $$\sqrt{(x_{S1}(t) - x_S(0))^2 + (y_{S1}(t) - y_S(0))^2}$$

In some embodiments, since the HAIP location data may be noisy, the positions $(x_{S1}(0), y_{S1}(0)$ and $(x_S(0), y_S(0))$ may be obtained by recording the positions of the HAIP tags of the audio capture device and the first sound source over a time window of some seconds (for example 30 seconds) and then averaging the recorded positions to obtain the inputs used in the equations above.

In some embodiments the calibration phase may be initialized by the SPAC device (for example the mobile device) being configured to output a speech or other instruction to instruct the user(s) to stay in front of the array for the 30 second duration, and give a sound indication after the period has ended.

Although the examples shown above show the position determiner/tracker generating position information in two dimensions it is understood that this may be generalized to three dimensions, where the position determiner/tracker may determine an elevation angle as well as an azimuth angle and distance.

In some embodiments other position determination/tracking means can be used for locating and tracking the moving sources. Examples of other tracking means may include inertial sensors, radar, ultrasound sensing, Lidar or laser distance meters, visual analysis, audio analysis and so on.

Visual analysis, for example, may be performed in order to localize and track pre-defined sound sources, such as persons and musical instruments. The visual analysis may be applied on panoramic video which is captured along with the spatial audio. This analysis may thus identify and track the position of persons carrying the sound source microphones based on visual identification of the person. The advantage of visual tracking is that it may be used even when the sound source is silent and therefore when it is difficult to rely on audio based tracking. The visual tracking can be based on executing or running detectors trained on suitable datasets (such as datasets of images containing pedestrians) for each panoramic video frame. In some other embodiments tracking techniques such as kalman filtering and particle filtering can be implemented to obtain the correct trajectory of persons through video frames. The location of the person with respect to the front direction of the panoramic video, coinciding with the front direction of the spatial audio capture device, can then be used as the direction of arrival for that source. In some embodiments, visual markers or detectors based on the appearance of the sound source microphones could be used to help or improve the accuracy of the visual tracking methods.

In some embodiments visual analysis can not only provide information about the 2D position of the sound source (i.e., coordinates within the panoramic video frame), but can also provide information about the distance, which is proportional to the size of the detected sound source, assuming that a "standard" size for that sound source class is known. For example, the distance of 'any' person can be estimated based on an average height. Alternatively, a more precise distance estimate can be achieved by assuming that the system knows the size of the specific sound source. For example the system may know or be trained with the height of each person who needs to be tracked.

In some embodiments the 3D or distance information may be achieved by using depth-sensing devices. For example a 'Kinect' system, a time of flight camera, stereo cameras, or camera arrays, can be used to generate images which may be analysed and from image disparity from multiple images a depth may or 3D visual scene may be created. These images may be generated by a camera.

Audio source position determination and tracking can in some embodiments be used to track the sources. The source direction can be estimated, for example, using a time difference of arrival (TDOA) method. The source position determination may in some embodiments be implemented using steered beamformers along with particle filter-based tracking algorithms.

In some embodiments audio self-localization can be used to track the sources.

There are technologies, in radio technologies and connectivity solutions, which can furthermore support high accuracy synchronization between devices which can simplify distance measurement by removing the time offset uncertainty in audio correlation analysis. These techniques have been proposed for future WiFi standardization for the multichannel audio playback systems.

In some embodiments, position estimates from indoor positioning, visual analysis, and audio source localization can be used together, for example, the estimates provided by each determiner or estimator may be averaged to obtain improved position determination and tracking accuracy. Furthermore, in order to minimize the computational load of visual analysis (which is typically much "heavier" than the analysis of audio or HAIP signals), visual analysis may be applied only on portions of the entire panoramic frame, which correspond to the spatial locations where the audio and/or HAIP analysis sub-systems have estimated the presence of sound sources.

Position estimation can, in some embodiments, combine information from multiple sources and combination of multiple estimates has the potential for providing the most accurate position information for the proposed systems. However, it is beneficial that the system can be configured to use a subset of position sensing technologies to produce position estimates even at lower resolution.

The system 101 furthermore may comprise a mix processor 121 configured to receive the outputs of the sound source microphones 111, 113, 115 and the spatial audio capture device 117. Furthermore in some embodiments the mixer 121 may be configured to receive the sound source positions (and tracking information) from the position tracker.

The mix processor 121 may be configured to mix the outputs of the sound source microphones 111, 113, 115 and the spatial audio capture device 117 and output these mixed signals to the render apparatus 131. The mix processor 121 as shown herein may be configured to receive an input from the mix controller (or render apparatus) 131 and the mix processor 121 may further generate a mix of the audio signals from the audio sources/spatial audio capture device (or apparatus) based on the input from the mix controller (render apparatus) 131.

The system 101 furthermore may comprise a mix controller (or render apparatus) 131. The mix controller (render apparatus) 131 shown in FIG. 1 is shown as an enhanced headphone user input device enabling the user of the mix controller (render apparatus) 131 to control the mix. In some embodiments the mix controller (render apparatus) 131 may thus be configured to provide a suitable selection and control output to the mix processor 121 to control the mix of audio sources and spatial audio capture device audio signals generated by the mix processor. Furthermore the mix controller (render apparatus) 131 may be configured to receive the mixed audio signals and output these via a suitable transducer means to the user.

Figure 2B:
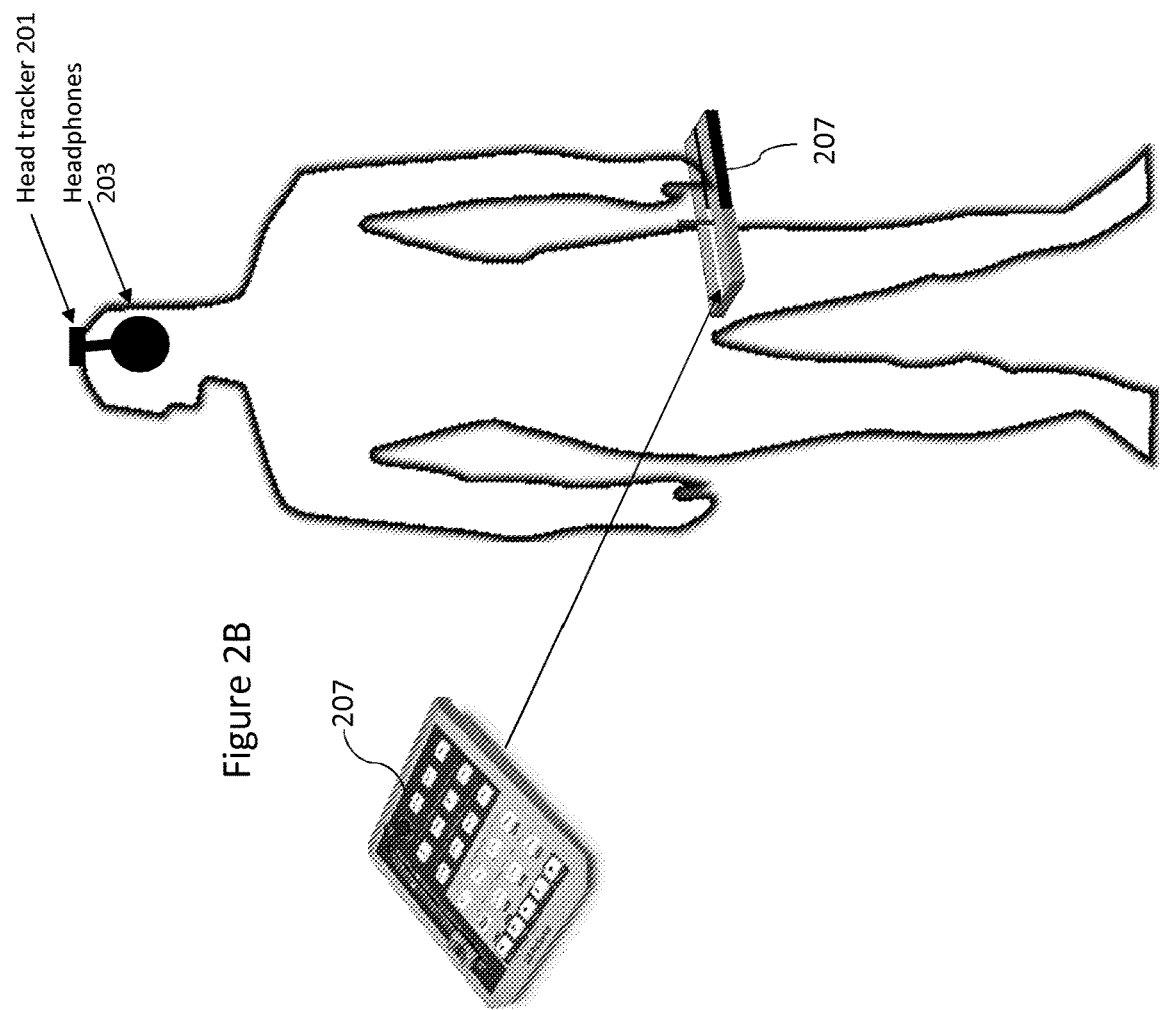
FIG. 2b shows schematically a head tracker/headphone/user input arrangement implemented within the system as shown in FIG. 1 according to some embodiments.
Figure 2A:
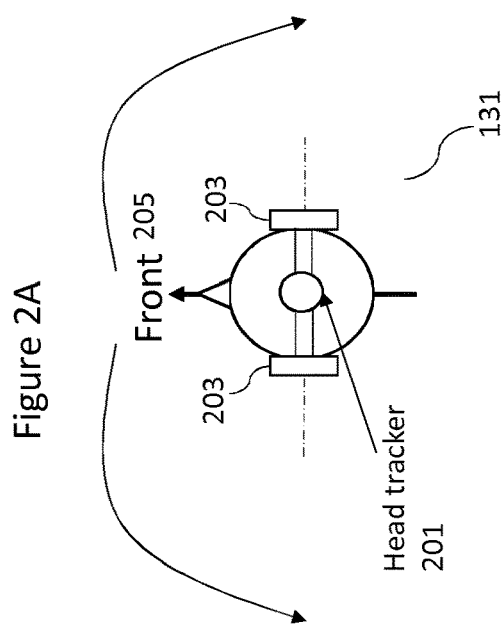
FIG. 2a shows schematically a head tracker/headphone arrangement implemented within the system as shown in FIG. 1 according to some embodiments.

With respect to FIGS. 2a and 2b example sound source tracker and mix controller (and also render apparatus) 131 according to some embodiments are shown in further detail. With respect to FIG. 2a the sound source tracker is shown with integrated render apparatus in the form of a pair of headphone transducers 203 which may be worn on the head of the user via a suitable band. In some embodiments the transducers 203 may be earpiece, earphone or similar transducers suitable for converting an electrical signal into an acoustic output for the user. Furthermore the sound source tracker and mix controller may comprise a sound source tracker or selector in the form of a head tracker 201.

The head tracker 201 may be any suitable inertial sensor which tracks the user's head orientation. In other words the head tracker 201 may be any suitable means for generating a measurement of azimuth (and/or elevation). For example the head tracker may be a sensor attached to the headphones band configured to monitor the orientation of the user operating the mix controller and furthermore listening to the output mix audio signal with respect to a defined or reference orientation (such as a 'front' 205 direction) and provide a value or input which can be output to the mix processor 121. The head tracker 201 may in some embodiments be implemented by at least one gyroscope and/or digital compass. For ease of operation, the head tracker and the spatial audio capture device microphone array can include a magnetic compass to remove the need for a dedicated manual calibration step. In the absence of a magnetic compass, the user with head tracker looks in the same direction as the reference axis of the audio capture system for calibrating the system. The head tracker 201 may be considered to be the 'look' controller associated with the 'look and do' operations described herein.

The sound source tracker may be implemented as any suitable 'point' or gesture apparatus suitable of indicating a direction associated with the direction which the apparatus is being 'pointed' or 'directed' at. For example a sound source tracker may be implemented as any suitable 'wearable' electronic device.

Furthermore FIG. 2*b* furthermore shows a suitable mix controller input device shown as a handheld controller 207. The handheld controller 207 may have physical controller elements, for example sliders, dials, buttons or may be virtual touch screen representations of physical controller elements. In some embodiments the physical controller elements are dynamically reconfigurable such that the same controller element may control a first parameter or function during a first time period and a second parameter or function during a second time period. The input device, the head tracker and the headphone transducers may in some embodiments communicate with the mix processor directly (in other words separately) or may communicate with the mix processor via a transceiver, for example a transceiver within the handheld controller 207. The input device may be considered to be the 'do' controller associated with the 'look and do' operations described herein.

As described herein the mix processor 121 can be configured to receive an input from the mix controller in the form of the head tracker 201 and the input device (handheld controller) 207. The mix processor 121, as described herein in further detail later, can be configured to mix together the audio signals (from the sound source microphones and the spatial audio capture device microphones) based on the positional information associated with the sources and the spatial audio capture device, the head tracker inputs and the input device inputs in order to generate a mixed audio signal. The mixed audio signal can for example be passed to the mix controller and output via the headphones 203. However the output mixed audio signal can be passed to any other suitable audio system for playback (for example a 5.1 channel audio amplifier).

Figure 3:
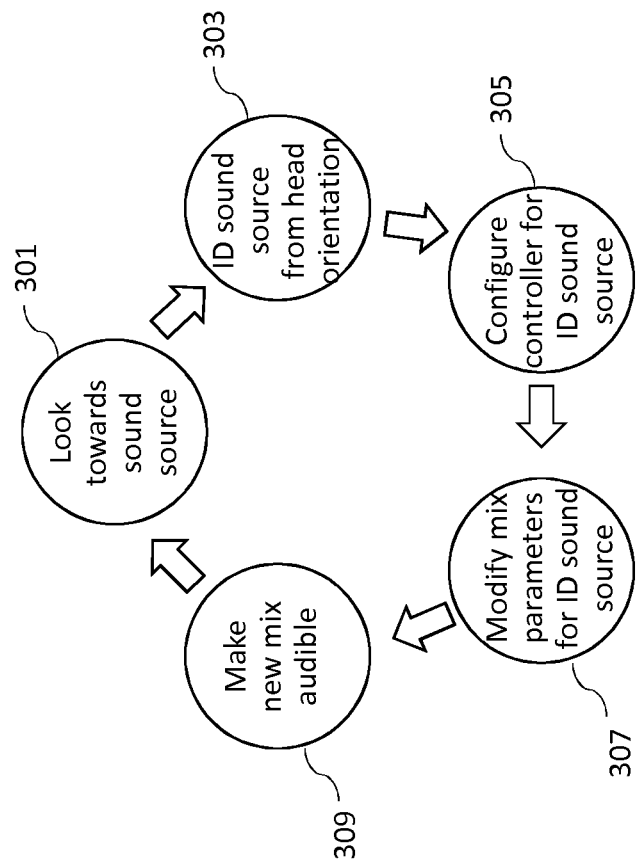
FIG. 3 shows a flow diagram overview of the method for implementing spatial audio mixing as shown in FIG. 1 according to some embodiments.

FIG. 3 shows a flow diagram overview of the method for controlling spatial audio mixing using the 'look and do' method implemented using the head tracker as an example of a sound source tracker and an input device as an example of a controller suitable of generating a control interaction according to some embodiments. Although this example shows the 'look and do' method with respect to audio mixing the 'look and do' method may be employed to control parameters associated with the at least one audio signal associated with the selected at least one sound source or process the at least one audio signal associated with the selected at least one sound source.

In a first operation the user wearing the head tracker (as the sound source tracker) looks towards a sound source which the user wants to change in the mix.

The operation of looking towards the sound source (or orientating the head tracker towards the sound source) is shown in FIG. 3 by step 301.

Having orientated the head tracker, in other words the sound source tracker generates a directional output, the orientation of the head tracker is then compared against the determined positions of the sound sources. Where the orientation of the head tracker is within a range of values about one of the sound source positions then the sound source is identified and/or selected. In some embodiments where the orientation of the head tracker is not within a range of values about one of the sound source positions then the spatial audio capture device is identified and/or selected. The identified and/or selected sound source/spatial audio capture device information may then be passed to the input device (handheld controller). In other words the current mix parameters associated with the selected or identified sound source/spatial audio capture device may be output to the input device. In some embodiments the sound source tracker or selector or identifier, for example the head-tracker, may be used to identify the sound source position and then the sound source is selected based on a pre-determined gesture from the sound source tracker.

The operation of identifying and/or selecting a sound source/spatial audio capture device from the head orientation is shown in FIG. 3 by step 303.

The input device (handheld controller) may then configure itself to enable inputs to be made for the identified/selected sound source/spatial audio capture device. In some embodiments control elements on the input device are assigned to the identified/selected sound source/spatial audio capture device to enable the user to change the parameters for mixing. The input device may be configured to display the current known status and/or mix parameters associated with the identified sound source/spatial audio capture device, having previously received the mix parameters or status information. For example the handheld controller virtual control elements may set themselves to the current parameter values.

The operation of configuring the input device or controller for the selected/identified sound source/spatial audio capture device is shown in FIG. 3 by step 305.

The user may then modify the mix parameters by changing the control elements on the input device or controller which are assigned to the selected/identified sound source/spatial audio capture device. For example the user may interact with the control elements in order to change a mix parameter.

The operation of modifying the mix parameter for the selected/identified sound source/spatial audio capture device is shown in FIG. 3 by step 307.

The modified mix parameter may then be used in the mix processor to generate a new mix of the audio signals and make the new mix audible by passing it to the headphones. This enables the user to assess the new mix and modify the same sound source/spatial audio capture device (by maintaining the sound source/spatial audio capture device in line of sight) or modify another sound source (by looking at the new sound source).

The operation of generating the new mix and making the new mix audible is shown in FIG. 3 by step 309. The operation may then return to step 301 where the user is able to 'look towards a sound source'.

Figure 4:
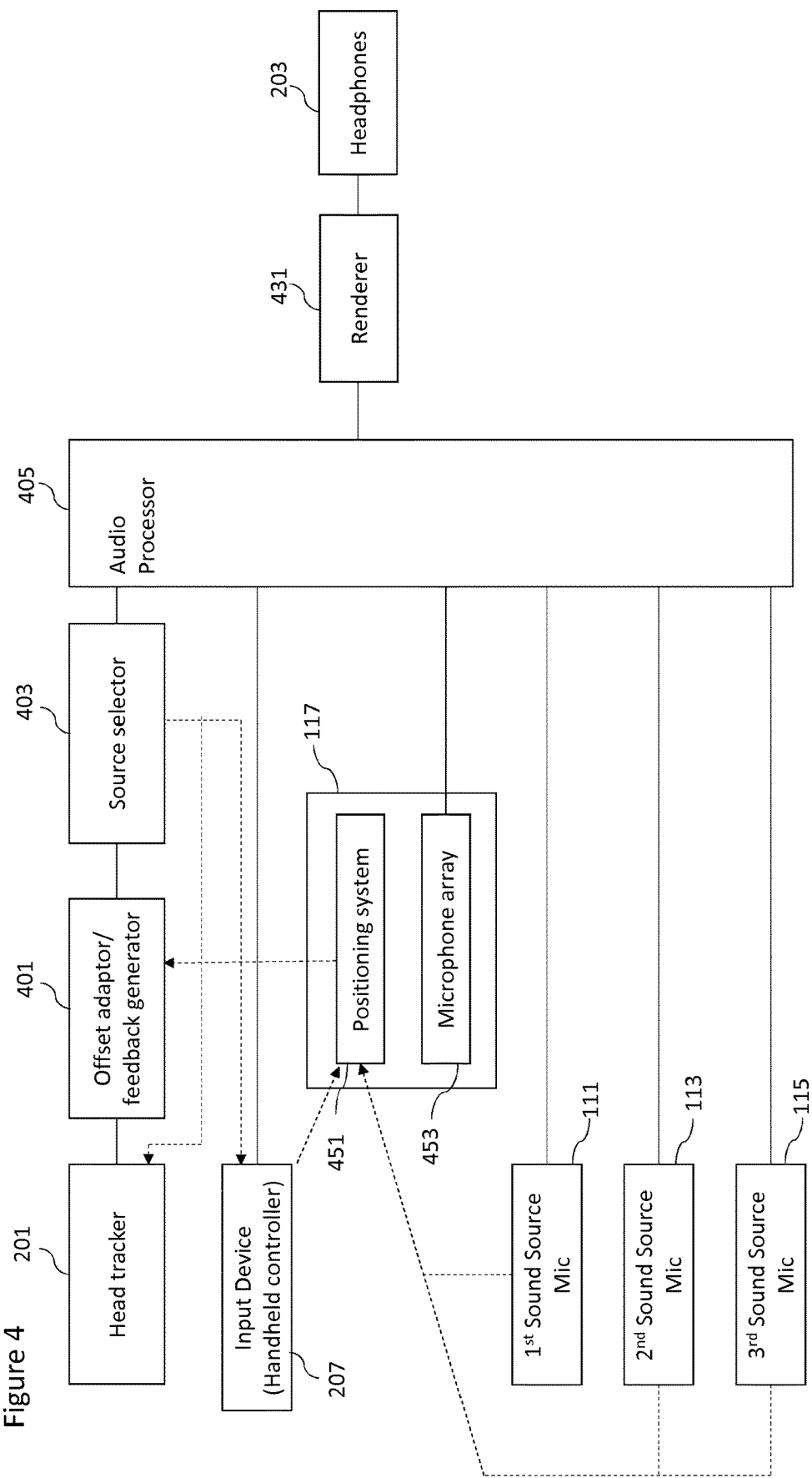
FIG. 4 shows schematically a distributed audio capture and mixing system as shown in FIG. 1 suitable for implementing spatial audio mixing in further detail.

With respect to FIG. 4 a detailed view of the system shown in FIG. 1 is shown. As described previously although the examples hereafter show the processing of the audio signals with respect to the mixing of audio signals from various sound sources the same apparatus and methods may be used to select and process any parameter associated with the audio signals individually.

The example system is shown in FIG. 4 comprising the three sound source microphones 111, 113, 115 which are configured to output the audio signals to the mix processor 121 (which in the example shown in FIG. 4 comprises an offset adaptor 401, a source selector 403, an audio processor 405 and a renderer 431).

Furthermore the system is shown in FIG. 4 comprising the spatial audio capture device or apparatus 117. The spatial audio capture device 117 is shown in FIG. 4 comprising a microphone array 453. The microphone array 453 may be configured to output the audio signals to the mix processor 121 (and in the example shown in FIG. 4 the mix processor is represented by the generic audio processor 405). The spatial audio capture device 117 is furthermore shown comprising a positioning system 451 configured to receive the position tag signals from or associated with the sound source microphones 111, 113, 115. The positioning system 451 may furthermore be configured (as shown in FIG. 4) to receive radio-frequency signals from the input device (representing the mix controller (or render apparatus) 131 position). From these signals the positioning system 451 may be configured to determine the position of the sound sources and the render apparatus relative to the spatial audio capture device 117. This relative position information may in some embodiments be passed to the mix processor 121 (and specifically as shown in FIG. 4 the offset adaptor 401).

The sound source tracker or selector 131 shown in FIG. 1 is represented within FIG. 4 by the headphones 203, head tracker 201 and input device shown as a handheld controller 207. As described herein the headphones 203 may be connected to the mix processor (and as shown in FIG. 4 the renderer 431) and be configured to receive a mixed audio signal which is output to the user controlling the mixing via the headphones 203. Furthermore the head tracker 201 may be configured to output directional information (for example the direction viewed by the user when wearing/using the sound source tracker) to the mix processor 121. In the example shown in FIG. 4 the head tracker 201 output is passed to the offset adaptor 401, however in some embodiments the head tracker 201 output may be passed directly to the source selector 403.

The input device 207 may furthermore be configured to be connected to the mix processor 121. In the example shown in FIG. 4 the input device may be configured to receive feedback/information from the source selector 403 and furthermore generate control signals for controlling the audio processor 405.

The mix processor 121 may comprise an offset adaptor 401. The offset adaptor 401 may be configured to receive the directional information or signals from the head tracker 201 (in other words the sound source tracker or determiner) and/or furthermore receive the relative position information of the sound sources and the mix controller from the positioning system 451. The offset adaptor 401 may be configured to perform an adaptation (or mapping) on the determined positions (for example the estimated positions of the sound source microphones, the sound source tracker and the spatial audio capture device) such that the head tracker (sound source tracker) directional output and the determined positions are aligned with respect to a common reference. In other words with respect to the example wherein the spatial audio capture device comprising the positioning system is the common reference the orientation of the head tracker directional output and the sound source positions are aligned such that the difference in position between the head tracker and the positioning system is accounted for.

For example in some embodiments the offset adaptor 401 may adapt the 'relative' positions of the sound source microphones with respect to the difference in position between the spatial audio capture device (comprising the positioning system) and the sound source tracker (comprising the head tracker or in other words the user controlling the mix position). Subsequently, offset adaptation enables the source selector to determine the sound source of interest (that was selected or deselected by the user), relative to the spatial capture apparatus.

Figure 5:
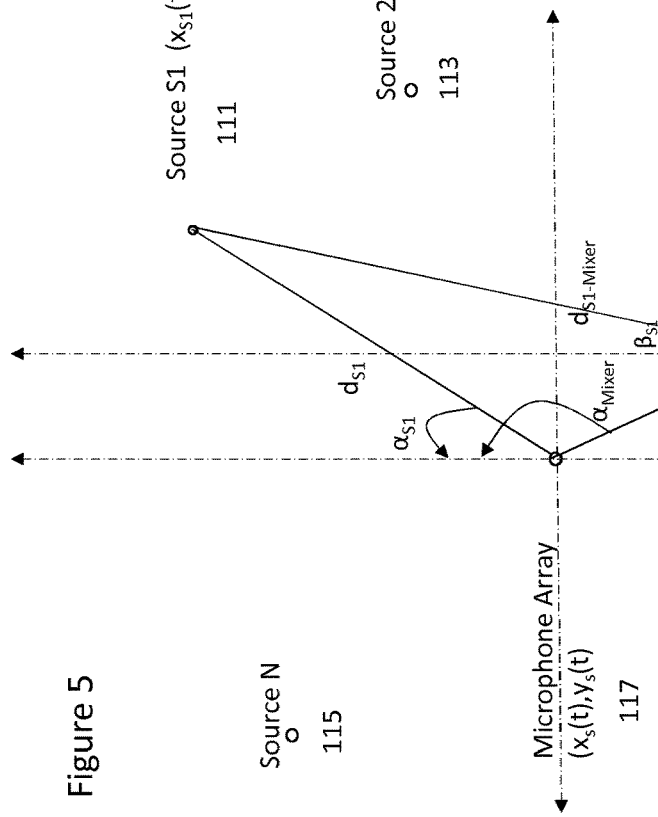
FIG. 5 shows an example offset adaptor calculation according to some embodiments.

FIG. 5 shows an example of the azimuth of the tracked sound sources from the spatial audio capture device microphone array and the user performing the mix (referred to as Mixer in FIG. 5) and the operation of the offset adaptor 401.

As discussed before the mix processor may determine a position of the spatial audio capture device 117 denoted with:

$(x_S(0), y_S(0))$

The first sound source microphone 111 position may be denoted with $(x_{S1}(t), y_{S1}(t))$ The sound source tracker 131 (i.e. the user operating the sound source tracker 131 which in these examples is the head tracker) is denoted with $(x_{MixC}(t), y_{MixC}(t))$.

The position of the sound source tracker may be determined as discussed above by any suitable means. For example the position may be determined by the spatial audio capture device positioning system and by equipping the head tracker with a position tag which generates a signal received by the spatial audio capture device.

The offset adaptor 401 may determine an azimuth angle β of the sound sources from a defined reference axis with respect to the 'sound source tracker position'. In the example shown in FIG. 5 the azimuth angle α defines an angle of the sound source from the defined reference axis (in other words with respect to the spatial audio capture device) at time t.

The angle $β_{S1}$ is then obtained as $βS1 = a\tan 2(y_{S1}(t) - y_{MixC}(0), x_{S1}(t) - x_{MixC}(0))$ where a tan 2(y,x) is "Four-Quadrant Inverse Tangent" which gives the angle between the positive x-axis and the point (x,y). For every a there is a corresponding β. In other words for each sound source microphone orientation from the 'point of view' of the spatial audio capture device (or positioning system) an orientation can be determined from the 'point of view' of the user of the sound source tracker (the head tracker). Where the reference orientation of the positioning system and the user of the sound source tracker are not aligned, a further offset determination is calculated. This further offset $β_{off}$ may be calculated as below:

βoff = β + difference(MixC offset, Mic array offset)

The MixC (sound source tracker) offset and Mic array offset are the offsets with respect to a common datum (e.g. magnetic North).

The offset sound source orientation and the head tracker orientation values may then be passed to the source selector 403.

The source selector 403 may be configured to receive the offset sound source orientation and the head tracker orientation (or sound source tracker directional) values and from these determine whether the user of the sound source tracker is looking at a sound source in order to select the sound source. The selection of the sound source based on the offset sound source orientation and the head tracker orientation may be any suitable selection operation. For example a selection of a sound source may be determined when the head tracker orientation is within a determined range or threshold of orientation values either side of the offset adapted sound source orientation. In order to prevent false positive selections or identifications from being determined the source selection operation may furthermore comprise a time based component wherein the head tracker orientation has to remain within the selection range of values for a determined time period. Similarly the source may then be deselected in some embodiments when the head tracker orientation is outside of the selection range of values (or a separate de-selection range of values which may be greater or less than the selection range) for a determined time period. The deselection time period may be the same as the selection period or a separate de-selection time period which is greater than or less than the selection time period. In some embodiments the selections or deselections may be performed with the assistance of the user input device. For example where multiple source selections are required the user may look towards and select each source and the input device provide an input to hold (and also release) the selection.

The source selector 403 may be configured to output to the audio processor 405 an indicator whether there is currently a source (or more than one source) identified or selected and if so which source(s) are identified/selected. Furthermore in some embodiments the source selector 403 may be configured to provide feedback to the sound source tracker or a controller or user controlling the mix (for example an audio/vibra signal can be output to the head-tracker/headphones to indicate that the head-tracker has 'selected' the source being viewed by the user or is in the selection/deselection range of orientations). In some embodiments the source selector may furthermore output the identity of any selected source to the input device or controller 207. Based on this identity information the input device or controller 207 may display to the user a suitable interface for changing any audio processing parameters associated with the sound source in the mix. In some embodiments the input device or controller 207 may furthermore communicate with the audio processor 405 (either directly or via the source selector or any suitable manner) to determine or obtain the current audio processing or mix parameters associated with the sound source in the mix and display these on the interface.

The audio processor 405 may be configured to receive indications of any identified/selected sources from the source selector 403 and furthermore may receive audio signals from the sound source microphones 111, 113, 115, and the spatial audio capture device microphone array 453. The audio processor 405 is configured to process and/or mix the audio signals from the sound source microphones 111, 113, 115, and the spatial audio capture device microphone array 453 based on various processing/mixing parameters. In the following examples audio signals from the sources and spatial audio capture device microphones may be processed by applying a gain value prior to mixing. However any suitable processing/mixing parameter may be controlled in a similar manner. The processing/mixing parameters may for example comprise the sound source/spatial capture position/orientation values, equalisation values, reverberation values, compression values or delay values.

The input device represented in FIG. 4 by the handhold controller 207 can be any suitable interface as described previously and may be configured to output to the audio processor 405 any changes to the parameters used in audio processing/mixing.

In some embodiments (as discussed earlier) the current parameters, for example the current gain values, associated with the selected sound source are received and displayed in a form which enables the user to interact with and change the parameter values.

Any changes to the parameter values associated with the selected source may then be passed to the audio processor 405.

The audio processor 405 may then apply the parameters, both with respect to the selected sound source and the other sound sources to generate a mixed audio signal.

The mixed audio signal may be output to a renderer 431.

The renderer 431 may be configured to generate a rendered audio output suitable to be output to the headphones. The rendering may in some embodiments be furthermore generated based on the positions of the sound sources and the head tracker (or mix controller) position and orientation. For example in some embodiments the renderer 431 is configured to generate a binaural audio downmix for the headphones where the directional parameters for the sound sources are reflected in the downmix. In such a manner any selected sound sources which have modified parameters cause the audio processor and the renderer to generate a modified mix of the audio environment which is presented to the user of the mix controller and thus enables the user of the mix controller to receive the 'feedback' from any audio processor parameter changes.

Audio processing such as featured in published patent applications US20130044884 and US2012128174 may be implemented in some embodiments.

Similarly the audio renderer may employ known spatial processing rendering methods and apparatus (to generate suitable binaural or other multichannel audio format signals.

The audio processor and renderer thus in some embodiments may be configured to combine the audio signals from the sound sources such as the microphones and the audio signals from the microphone array. These audio signals may be combined to a single binaural output which can be listened through headphones.

Based on the parameter values associated with the sound sources/spatial audio capture device, the sound source microphone signals can be mixed and processed into the spatial audio field defined by the spatial audio capture device microphone array audio signals. As discussed above the rendering furthermore in some embodiments can be implemented based on the source positions and the position/direction of head tracker. In some embodiments the rendering is implemented by rendering the spatial audio signal using virtual loudspeakers with fixed positions, and the captured audio source is rendered from a time varying position. Thus, the renderer may in some embodiments be configured to control the azimuth, elevation, and distance of the source based on tracked position information.

Figure 6:
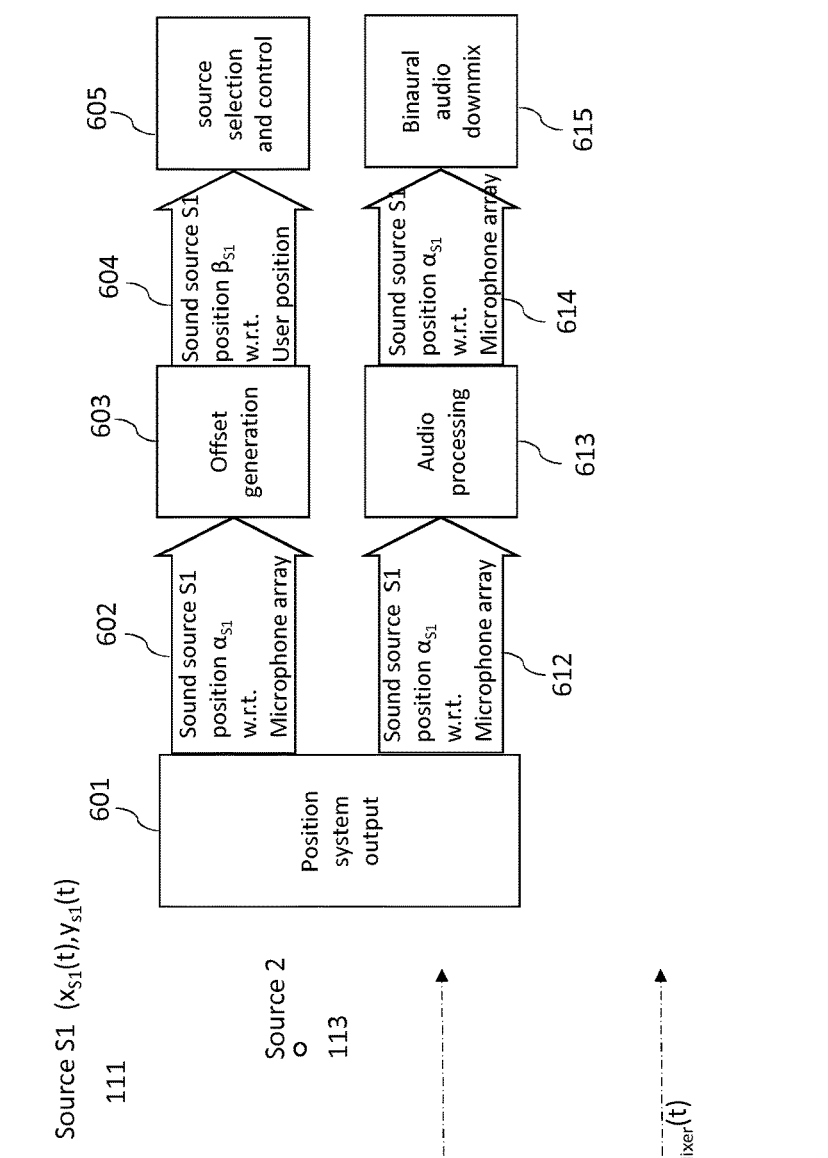
FIG. 6 shows position system outputs according to some embodiments.

With respect to FIG. 6 the use of the output of the position system is shown in further detail. The position system output 601 in the form of sound source position (shown as sound source S1 and the azimuth angle $\alpha_{S1}$ with respect to the microphone array) may be passed on one branch 602 to the offset adaptor and on another branch 612 to the audio processor. The first branch then generates 603 the offset (angle) such that it passes 604 a sound source position $\beta_{S1}$ with respect to the user mix controller position to the source selector. The first branch then uses the sound source position with respect to the user position to determine source selection and control 605. The second branch may process 613 the change in the parameter, for example the sound source position with respect to the microphone array. The processed sound source position may then be passed 614 to the renderer. The renderer may then generate 615 the audio rendering, for example the binaural audio downmix using the processed sound source position. A modified audio scene is thus rendered in response to the user input, as form of feedback. In the simplest case, this feedback consists of binaural audio but may also include visual or tactile indications.

With respect to FIG. 7 a diagram of a simple processing operation is shown. In this example the head tracker output (the directional output from the sound source tracker) varies from 0 to 360 azimuth as shown by the X axis. The first line 700 represents a sound source microphone associated with source 1, the second line 702 represents a sound source microphone associated with source 2, the third line 704 represents a sound source microphone associated with source 3 and fourth line 706 represents a spatial audio capture device microphone array. The sound source positions are represented by the dots at their relative azimuth offset with respect to the spatial microphone array. $SW_i$, and SCWi represent the mix gain weights of the sound source microphone sources ($SW_1$, $SW_2$, $SW_3$) and the spatial audio capture device ($SCW_1$, $SCW_2$, $SCW_3$), for performing the mix when a specific sound source is selected. All the sound source microphone selection ranges are assumed to be of a certain range of azimuth values or width (for example the width is shown in FIG. 7 by $BW_1$ 701 for the first sound source, $BW_2$ 703 for the second sound source, and $BW_3$ 705 for the third sound source) for performing the mix. $SCW_{solo}$ is the mix gain weight of the spatial audio capture device when there is no sound source microphone selected. Thus for example when sound source 1 is selected, when the azimuth value is within the range defined by $BW_1$ 701, then the audio processor (or mixer processor) is configured to generate a mix of the first source using gain $SW_1$ and the spatial audio capture device using gain $SCW_1$. When sound source 2 is selected, when the azimuth value is within the range defined by $BW_2$ 703, then the audio processor (or mixer processor) is configured to generate a mix of the second source using gain $SW_2$ and the spatial audio capture device using gain $SCW_1$. When sound source 3 is selected, when the azimuth value is within the range defined by $BW_3$ 705, then the audio processor (or mixer processor) is configured to generate a mix of the third source using gain $SW_3$ and the spatial audio capture device using gain $SCW_3$. Otherwise when no sound source is selected, when the azimuth value is not within the ranges defined by $BW_1$ 701, $BW_2$ 703 or $BW_3$ 705, then the audio processor (or mixer processor) is configured to generate a mix of the spatial audio capture device using gain $SCW_{solo}$.

In this example to generate the mix, audio from an individual audio source of interest with a sound source microphone is emphasized in the mix. In some embodiments of the implementation, the user may have an option to emphasize the sound source microphone signal, replace the microphone array captured signal or mute the close up microphone.

In some embodiments where there is no sound source microphone in the direction of the offset head tracker orientation (the direction of interest), the audio processor and renderer may be configured to generate a modified audio signal to emphasize the spatial capture audio apparatus microphone array determined sound source(s) with the particular direction of arrival (with respect to the microphone array).

FIG. 8 presents a flow chart of the method according to some embodiments.

In the first step, a user head orientation is obtained. For example the head tracker orientation or more generally the sound source tracker directional output is determined. Furthermore the sound source orientations with respect to the position of the user of the sound source tracker are obtained. For example these values may be determined from applying the positioning system to rendering device offset to the sound source orientations with respect to the positioning system.

The operation of obtaining the user head orientation (or similar sound source tracker orientations) and the sound source orientations from the sound source tracker position is shown in FIG. 8 by step 801.

The following step is one where the user head orientation (or generally the sound source tracker direction) is compared with the sound source orientation (azimuth) values to determine whether there are any sound sources in the 'same' (or similar) direction as the user's head (or sound source tracker) orientation (or there is less than a threshold difference between the two values).

The operation of comparing the orientation/directional values in the form of determining the presence of sound source at less than a threshold angular difference is shown in FIG. 8 by step 803.

The comparison is then tested as to whether a sound source is within the user's head direction (in other words whether the sound source is identified/selected).

The operation of determining the sound source in the users head direction (or sound source tracker direction) is shown in FIG. 8 by step 805. As described previously in some situations any identified sound sources may then furthermore be selected by the detection of a suitable input such as a pre-determined gesture detected from the sound source tracker.

Where there is a selected/identified sound source, the input device (by the user's control interactions) is able to provide inputs or control interactions which control (change parameter values) the modification or processing of the audio signals associated with the selected sound source.

The operation of applying control interactions to the selected source is shown in FIG. 8 by step 817.

Where the head movements do not release the source then the user may apply further inputs via the input device as shown by the loop from step 817 to step 817.

The audio signals or the mix of audio signals may then be modified according to the new parameter values provided by the user's control interactions. The modified audio signals or mix of audio signals may then made available to the user as a feedback to ascertain the effect of the control interactions.

The operation of modifying the audio signals or mix based on the parameter values provided by the user, or changing the audio signals within the sound scene based on the received user control parameter values, is shown in FIG. 8 by step 819.

In the example shown in FIG. 8 the selected sound source is not released immediately based on user head movements. This is because moving the head around is an integral part of experiencing the mix and mixing. Thus in some embodiments the selected sound source is released only after a suitable timeout after a parameter input change (an implicit release) or with an explicit input to release the selected source (explicit release) by the user. In some embodiments the system monitors when was the last control applied to the identified/selected source, and when this determined time (since applying the last control) exceeds a predetermined threshold (for example 5 seconds or any other suitable value) the system releases or deselects the source.

The operation of releasing the selected sound source is shown in FIG. 8 by step 821.

Where there is no selected sound source (or sound source in the particular head orientation), the spatial audio captured signal may be identified or selected and modified to incorporate the user control interactions.

In some embodiments the initial head position of the user (or the sound source tracker) is set as a position of a "virtual sound source".

The operation of applying control interactions to the spatial audio capture device audio signal is shown in FIG. 8 by step 807.

Where the head movements do not release the 'source' then the user may apply further inputs via the input device as shown by the loop from step 807 to step 807.

The audio mix is modified according to the parameter values provided by the user's control interactions. The modified mix is available to the user as a feedback to ascertain the effect of the control interactions.

The operation of modifying the audio mix based on the parameter values provided by the user is shown in FIG. 8 by step 809.

The release of the 'virtual source' in the form of the spatial audio capture device is also done in the same way as the other microphone sources. The selected virtual sound source is released only after a suitable timeout after a parameter input change (an implicit release) or with an explicit input to release the selected virtual source (explicit release) by the user.

The operation of releasing the selected virtual sound source is shown in FIG. 8 by step 811.

Figure 9:
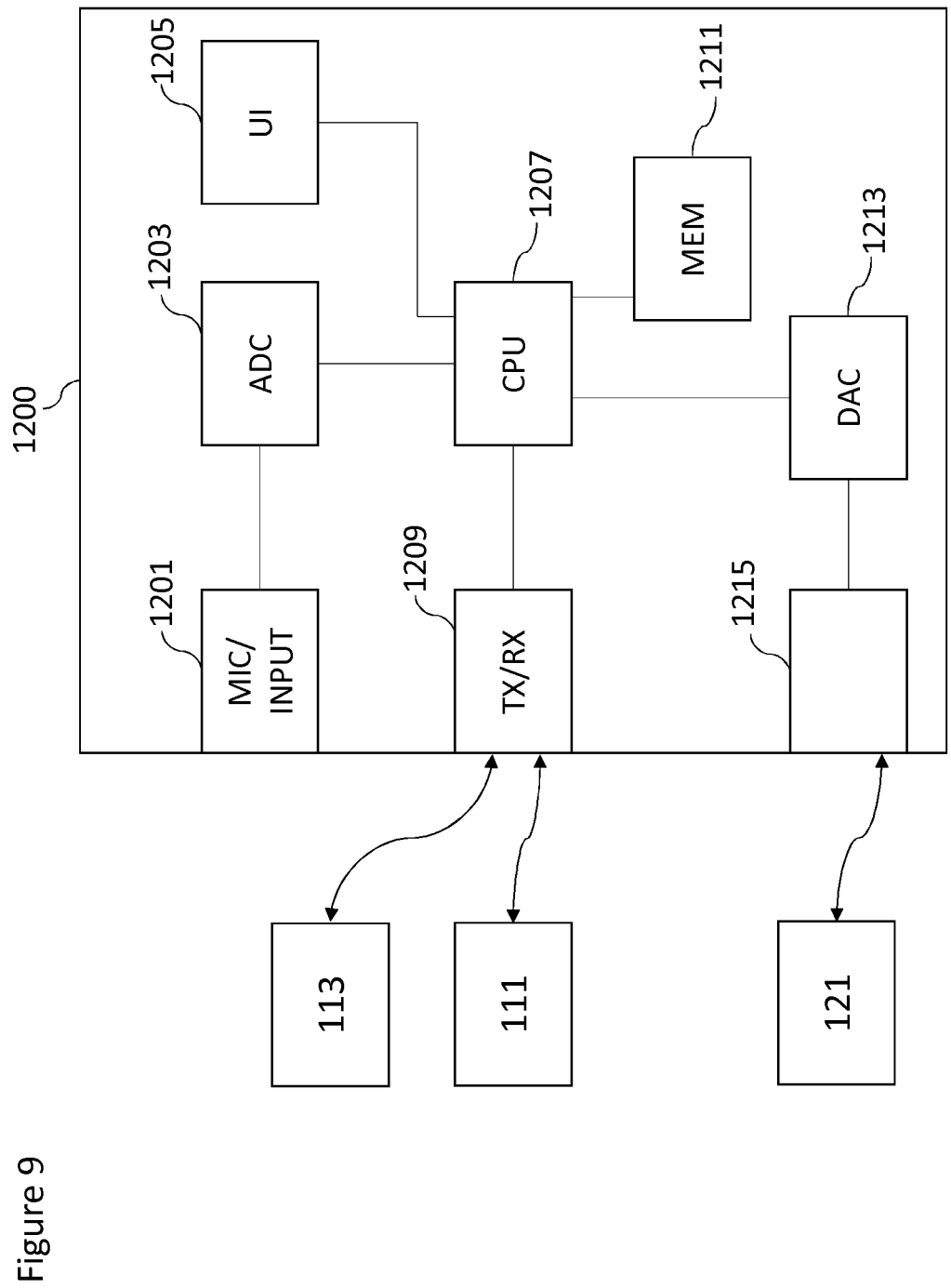
FIG. 9 shows an example electronic device suitable for implementing embodiments.

With respect to FIG. 9 an example electronic device which may be used as at least part of the mix controller 131, mix processor 121, or spatial audio capture device 117 is shown. The device may be any suitable electronics device or apparatus. For example in some embodiments the device 1200 is a virtual or augmented reality capture device, a mobile device, user equipment, tablet computer, computer, audio playback apparatus, etc.

The device 1200 may comprise a microphone array 1201. The microphone array 1201 may comprise a plurality (for example a number N) of microphones. However it is understood that there may be any suitable configuration of microphones and any suitable number of microphones. In some embodiments the microphone array 1201 is separate from the apparatus and the audio signals transmitted to the apparatus by a wired or wireless coupling. The microphone array 1201 may in some embodiments be the SPAC microphone array 453 as shown in FIG. 4.

The microphones may be transducers configured to convert acoustic waves into suitable electrical audio signals. In some embodiments the microphones can be solid state microphones. In other words the microphones may be capable of capturing audio signals and outputting a suitable digital format signal. In some other embodiments the microphones or microphone array 1201 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphones can in some embodiments output the audio captured signal to an analogue-to-digital converter (ADC) 1203.

The device 1200 may further comprise an analogue-to-digital converter 1203. The analogue-to-digital converter 1203 may be configured to receive the audio signals from each of the microphones in the microphone array 1201 and convert them into a format suitable for processing. In some embodiments where the microphones are integrated microphones the analogue-to-digital converter is not required. The analogue-to-digital converter 1203 can be any suitable analogue-to-digital conversion or processing means. The analogue-to-digital converter 1203 may be configured to output the digital representations of the audio signals to a processor 1207 or to a memory 1211.

In some embodiments the device 1200 comprises at least one processor or central processing unit 1207. The processor 1207 can be configured to execute various program codes. The implemented program codes can comprise, for example, SPAC control, position determination and tracking and other code routines such as described herein.

In some embodiments the device 1200 comprises a memory 1211. In some embodiments the at least one processor 1207 is coupled to the memory 1211. The memory 1211 can be any suitable storage means. In some embodiments the memory 1211 comprises a program code section for storing program codes implementable upon the processor 1207. Furthermore in some embodiments the memory 1211 can further comprise a stored data section for storing data, for example data that has been processed or to be processed in accordance with the embodiments as described herein. The implemented program code stored within the program code section and the data stored within the stored data section can be retrieved by the processor 1207 whenever needed via the memory-processor coupling.

In some embodiments the device 1200 comprises a user interface 1205. The user interface 1205 can be coupled in some embodiments to the processor 1207. In some embodiments the processor 1207 can control the operation of the user interface 1205 and receive inputs from the user interface 1205. In some embodiments the user interface 1205 can enable a user to input commands to the device 1200, for example via a keypad. In some embodiments the user interface 205 can enable the user to obtain information from the device 1200. For example the user interface 1205 may comprise a display configured to display information from the device 1200 to the user. The user interface 1205 can in some embodiments comprise a touch screen or touch interface capable of both enabling information to be entered to the device 1200 and further displaying information to the user of the device 1200.

In some implements the device 1200 comprises a transceiver 1209. The transceiver 1209 in such embodiments can be coupled to the processor 1207 and configured to enable a communication with other apparatus or electronic devices, for example via a wireless communications network. The transceiver 1209 or any suitable transceiver or transmitter and/or receiver means can in some embodiments be configured to communicate with other electronic devices or apparatus via a wire or wired coupling.

For example as shown in FIG. 9 the transceiver 1209 may be configured to communicate with the sound sources such as 111 and 113.

The transceiver 1209 can communicate with further apparatus by any suitable known communications protocol. For example in some embodiments the transceiver 209 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1200 may be employed as a mixer and/or render apparatus. As such the transceiver 1209 may be configured to receive the audio signals and positional information, and generate a suitable audio signal rendering by using the processor 1207 executing suitable code. The device 1200 may comprise a digital-to-analogue converter 1213. The digital-to-analogue converter 1213 may be coupled to the processor 1207 and/or memory 1211 and be configured to convert digital representations of audio signals (such as from the processor 1207 following an audio rendering of the audio signals as described herein) to a suitable analogue format suitable for presentation via an audio subsystem output. The digital-to-analogue converter (DAC) 1213 or signal processing means can in some embodiments be any suitable DAC technology.

Furthermore the device 1200 can comprise in some embodiments an audio subsystem output 1215. An example, such as shown in FIG. 9, may be where the audio subsystem output 1215 is an output socket configured to enabling a coupling with the headphones 121. However the audio subsystem output 1215 may be any suitable audio output or a connection to an audio output. For example the audio subsystem output 1215 may be a connection to a multichannel speaker system.

In some embodiments the digital to analogue converter 1213 and audio subsystem 1215 may be implemented within a physically separate output device. For example the DAC 1213 and audio subsystem 1215 may be implemented as cordless earphones communicating with the device 1200 via the transceiver 1209.

Although the device 1200 is shown having both audio capture and audio rendering components, it would be understood that in some embodiments the device 1200 can comprise just the audio capture or audio render apparatus elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. Apparatus comprising:
   at least one processor; and
   at least one non-transitory memory including computer program code;
   the at least one memory and the computer program code configured to, with the at least one processor, cause the apparatus at least to:
   determine a position for at least one sound source relative to a reference position, and a position for a head tracker relative to the reference position;
   determine a direction associated with the head tracker;
   select the at least one sound source based on the determined direction associated with the head tracker, the position for the at least one sound source and the position of the head tracker;
   receive at least one control interaction associated with the selected at least one sound source from at least one controller;
   process at least one audio signal associated with the selected at least one sound source based on the at least one control interaction; and
   output the processed at least one audio signal for rendering.

2. The apparatus as claimed in claim 1, wherein the at least one sound source comprises at least one of:

an external microphone sound source;
a close microphone sound source; or
a spatial audio capture device microphone array sound source.

3. The apparatus as claimed in claim 1, wherein the head tracker comprises at least one of:
a digital compass configured to generate the direction;
a gyroscope configured to generate the direction;
a beacon positioning system configured to generate the direction; or
a headset configured to generate a direction of a user of the at least one controller.

4. The apparatus as claimed in claim 1, wherein selecting the at least one sound source comprises the at least one memory and the computer program code are configured to, with the at least one processor, cause the apparatus to:
determine a direction of the at least one sound source relative to the head tracker.

5. The apparatus as claimed in claim 4, wherein determining the direction of the at least one sound source relative to the head tracker comprises the at least one memory and the computer program code are further configured to, with the at least one processor, cause the apparatus to:
offset the position of the at least one sound source based on the position of the head tracker.

6. The apparatus as claimed in claim 1, wherein the reference position is at least one of:
a position of at least one spatial capture device, or
a position of at least one microphone array.

7. The apparatus as claimed in claim 4, wherein selecting the at least one sound source comprises the at least one memory and the computer program code are further configured to, with the at least one processor, cause the apparatus to perform at least one of:
select the at least one sound source in response to a difference between the direction of the at least one sound source relative to the head tracker and the direction associated with the head tracker is less than a threshold value; or
select the at least one sound source in response to the difference between the direction of the at least one sound source relative to the head tracker and the direction associated with the head tracker is less than the threshold value for a selection time period.

8. The apparatus as claimed in claim 1, wherein determining the position for the at least one sound source relative to the reference position comprises the at least one memory and the computer program code are further configured to, with the at least one processor, cause the apparatus to:
determine a position of at least one spatial capture sound source relative to the reference position; and
determine a direction of the at least one spatial capture sound source relative to the head tracker.

9. The apparatus as claimed in claim 8, wherein the at least one memory and the computer program code are configured to, with the at least one processor cause the apparatus to select the at least one spatial capture sound source, comprising at least one of:
select the at least one spatial capture sound source in response to a difference between the direction of the at least one spatial capture sound source relative to the head tracker and the direction associated with the head tracker is greater than a first threshold value;
select the at least one spatial capture sound source in response to the difference between the direction of the at least one spatial capture sound source relative to the head tracker and the direction associated with the head tracker is greater than the first threshold value for a first selection time period;
select the at least one spatial capture sound source in response to the difference between the direction of the at least one spatial capture sound source relative to the head tracker and the direction associated with the head tracker is less than a second threshold value for a second selection time period; or
select the at least one spatial capture sound source in response to the difference between the direction of the at least one spatial capture sound source relative to the head tracker and the direction associated with the head tracker is less than the second threshold value.

10. The apparatus as claimed in claim 1, wherein receiving the at least one control interaction comprises the at least one memory and the computer program code are further configured to, with the at least one processor, cause the apparatus to:
indicate to the at least one controller selection of the at least one sound source, wherein the at least one controller is configured to generate at least one processing parameter value associated with the selected at least one sound source;
receive the at least one processing parameter value from the at least one controller; and
process the at least one audio signal based on the at least one processing parameter value.

11. The apparatus as claimed in claim 10, wherein the at least one memory and the computer program code are configured to, with the at least one processor, cause the apparatus to:
determine at least one stored processing parameter value associated with the selected at least one sound source;
indicate the at least one stored processing parameter value to the at least one controller; and
display the at least one stored processing parameter value using the at least one controller.

12. The apparatus as claimed in claim 1, wherein processing the at least one audio signal comprises the at least one memory and the computer program code are configured to, with the at least one processor, cause the apparatus to at least one of:
filter/equalise the at least one audio signal;
delay the at least one audio signal;
apply a gain to the at least one audio signal; or
mix the at least one audio signal associated with the selected at least one sound source to an audio signal associated with at least one spatial capture device.

13. The apparatus as claimed in claim 1, wherein the at least one memory and the computer program code are configured to, with the at least one processor, cause the apparatus to deselect the selected at least one sound source, comprising at least one of:
receive a deselection indicator from the at least one controller;
determine a time period since receiving the at least one control interaction greater than an input deselection time period; or
determine a change in the direction associated with the head tracker greater than a deselection direction range.

14. The apparatus as claimed in claim 1, wherein the head tracker comprises a headband configured to generate the direction associated with the head tracker, the direction being associated with a viewing direction of a user.

15. The apparatus as claimed in claim 1, wherein the at least one controller comprises a user input device configured to generate the at least one control interaction associated with the selected at least one sound source.

16. The apparatus as claimed in claim 1, wherein the head tracker is integrated within a headband worn by a user, the headband furthermore integrating a pair of transducers, wherein the at least one memory and the computer program code are configured to, with the at least one processor, cause the apparatus to output the processed at least one audio signal to the pair of transducers for rendering.

17. A method comprising:
   determining a position for at least one sound source relative to a reference position, and a position for a head tracker relative to the reference position;
   determining a direction associated with the head tracker;
   selecting the at least one sound source based on the determined direction associated with the head tracker, the position for the at least one sound source and the position of the head tracker;
   receiving at least one control interaction associated with the selected at least one sound source from at least one controller;
   processing at least one audio signal associated with the selected at least one sound source based on the at least one control interaction; and
   outputting the processed at least one audio signal for rendering.

18. The method as claimed in claim 17, wherein receiving the at least one control interaction associated with the selected at least one sound source from at least one controller comprises:
   indicating to the at least one controller selection of the at least one sound source, wherein the at least one controller is configured to generate at least one processing parameter value associated with the selected at least one sound source;
   receiving the at least one processing parameter value from the at least one controller, and wherein processing the at least one audio signal associated with the at least one selected sound source based on the at least one control interaction comprises processing the at least one audio signal based on the at least one processing parameter value.

19. Apparatus comprising:
   at least one processor; and
   at least one non-transitory memory including computer program code;
   the at least one memory and the computer program code configured to, with the at least one processor, cause the apparatus at least to:
      determine a position for at least one sound source relative to a microphone array;
      identify the at least one sound source position with a head tracker;
      select the at least one sound source based on a pre-determined gesture of the head tracker, wherein the pre-determined gesture comprises moving a direction of the head tracker within a threshold value of a direction of the at least one identified sound source position;
      receive at least one control interaction associated with the selected at least one sound source from at least one controller;
      modify at least one audio signal of the selected at least one sound source based on the at least one control interaction with the controller; and
      output the modified at least one audio signal for rendering.

20. A method comprising:
   determining a position for at least one sound source relative to a microphone array;
   identifying the at least one sound source position with a head tracker;
   selecting the at least one sound source based on a pre-determined gesture of the head tracker, wherein the pre-determined gesture comprises moving a direction of the head tracker within a threshold value of a direction of the at least one identified sound source position;
   receiving at least one control interaction associated with the selected at least one sound source from at least one controller;
   modifying at least one audio signal of the selected at least one sound source based on the at least one control interaction with the controller; and
   outputting the modified at least one audio signal for rendering.

* * * * *